United States Patent Office 3,474,815
Patented Oct. 28, 1969

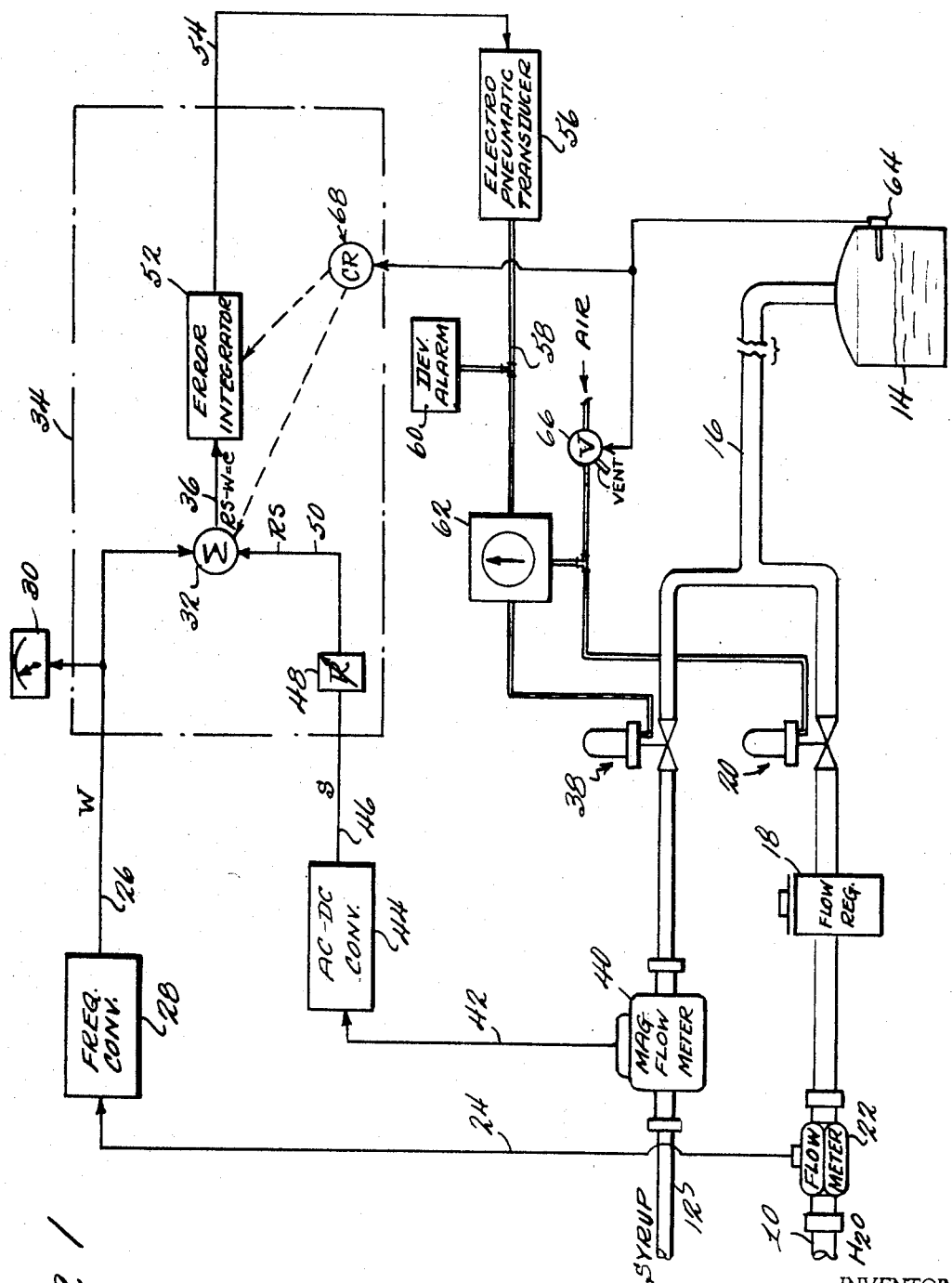

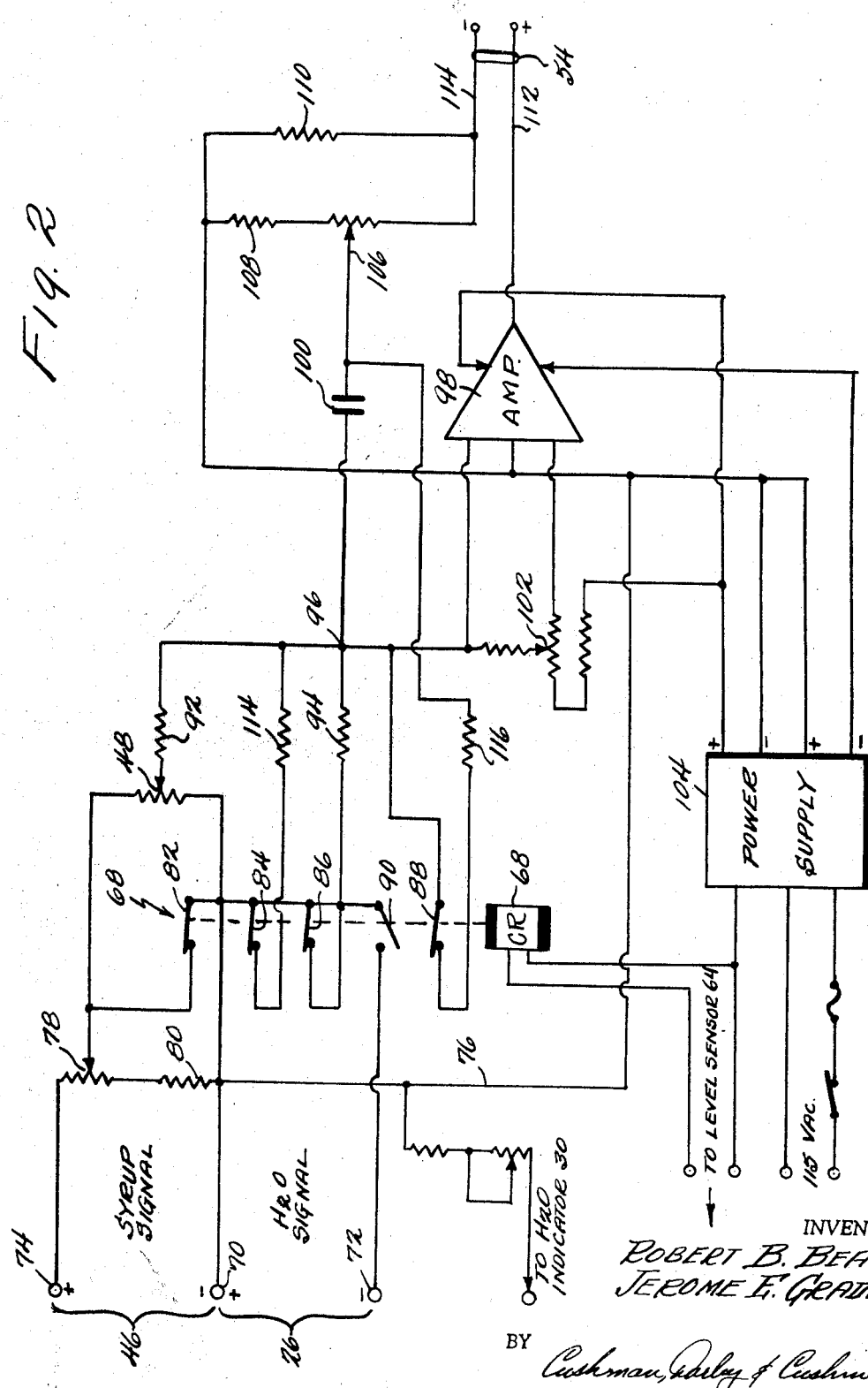

3,474,815
FLUID PROPORTIONING AND BLENDING SYSTEM
Robert B. Beahm and Jerome E. Grader, Rochester, N.Y., assignors, by mesne assignments, to Crown Cork & Seal Company, Inc., Philadelphia, Pa., a corporation of New York
Filed Dec. 17, 1965, Ser. No. 514,571
Int. Cl. G05d *11/02;* G06f *15/20;* G05b *11/60*
U.S. Cl. 137—101.19                      8 Claims

ABSTRACT OF THE DISCLOSURE

Apparatus for proportioning a plurality of fluids with means to determine the flow rate of each of the fluids and to produce electrical signals having amplitudes proportional to the respective flow rates. One of the signals thus produced is then multiplied by a given factor which is equal to the desired ratio of the fluid quantities and the difference between the changed and unchanged signals integrated. The integrated signal then controls the rate of flow of one of the fluids to maintain the total flow quantities at a ratio corresponding to the desired ratio.

---

This invention relates to regulation of fluid flow. In its broader aspects, fluid flow is controlled with regard to a signal indicating a particular flow rate. In more detail, that signal may be the result of sensing the flow rate of another fluid, for example, a fluid which is to be blended with the first fluid in order to make a soft drink, for example.

In conventional flow control systems where blending of fluid streams is either continuous so that there will be no "hold up" at any point in the lines, a simple ratio system provides an effective control. For example, a ratio controller as in the Brewer Patent No. 2,481,496, issued Sept. 13, 1949, provides an effective control where there is no need of any start or stop of the fluid flow. In such a system, the flow rate of both fluids is monitored and the output of one of the monitors is changed by a preset factor to be similar to the output of the other, and the difference between the two is utilized to regulate the flow rate of the two fluids at the desired ratio determined by the preset factor. If at any instant the flow rate in one line changes due to a load disturbance, such a ratio control system varies the flow in the other line in the direction of the change so as to maintain the same ratio. Hence, the outputs of the two lines when connected together, result in the desired blend. It has been noted, however, that a ratio control of that type, such as set forth in the Brewer patent, does not allow for accurate blending because the moment that the fluid in one line is experiencing a load change, the flow in the other line is still at the previously determined rate. In the past, this has been usually ignored, since flow is relatively fast and the period of recovery is relatively short, and the errors introduced in the blend have been considered insignificant. Even in large batches, the accumulated errors may fall within the tolerance of the batch since the relative size and duration of the load disturbances are very small compared to those of the batch.

Unfortunately, when blending of a plurality of fluids involves a small batching operation, or where the operation is interrupted because a tank into which the blended fluid is directed becomes too full, or where the accuracy of a large batch blending in considered very critical, the simple ratio control system does not satisfy the requirements. This is true because the unrecoverable errors due to load changes, startup, and distance velocity lags in the system, accumulate to an amount that may be significant with respect to the size of the batch.

It is, therefore, the principal object of this invention to provide an improved flow control system that nullifies such totalized errors by remembering and compensating for individual errors.

It is another object of this invention to provide electronic apparatus for determining from the respective rates of flow of a plurality of fluids, the accumulated error in the quantity ratio of the fluids when one of the rates has been modified by a predetermined factor corresponding to the desired quantity ratio between the fluids.

The foregoing objects are accomplished by provision of an analog proportioning system that remembers component flows, i.e., that remembers the total amounts of each fluid being proportioned, to effect a control of the instantaneous total quantity ratio. The desired ratio between each two fluid streams is set into the system manually by means of a manual potentiometer in the accumulated error computer of the system. This computer includes a summing integrator, the output of which is employed to regulate the position of a valve in one of the lines.

It is, therefore, another object of this invention to provide apparatus of the type mentioned above.

Still further objects and advantages of this invention will become apparent to those of ordinary skill in the art after reading the appended claims and the following detailed description, in which:

FIGURE 1 is a schematic representation of the system, and

FIGURE 2 is an electrical schematic showing details of the computer portion of FIGURE 1.

While the description of this invention proceeds in relation to equipment for proportioning and blending fluids such as water and syrup to form a soft drink, it is to be understood that the invention may be employed in the beverage, brewery, chemical, oil, gas, etc. industries to control any type of fluid or fluids, including gases as well as liquids, and any number of fluids.

In FIGURE 1, the water supply line is designated 10, while syrup is received via line 12. It is to be understood that these fluids are both under pressure from their respective sources (not shown). It is a purpose of the specific system being described, to fill a container, such as a conventional cooling tank 14 that may be found in a bottling plant, with a proportioned blend of the syrup and water through a blending tube 16, so that the blended fluid can be used from the cooling tank to fill soft drink bottles operating along conventional conveyor lines, as in a bottling room.

The flow rate in one of the lines, preferably water line 10, is maintained substantially constant in any desired manner, for example, by use of a flow rate regulator 18 having a construction similar to that described in Kates Patent No. 2,800,919. The flow rate is kept substantially constant by such a regulator as long as the fluid pressure is maintained within predetermined limits, for example, between 30 and 75 p.s.i. Also in the water line 10, is an air-operated on-off valve 20, which is described below in more detail as to its function, it being sufficient for the moment to indicate that it opens and closes water line 10 when directed to do so.

Notwithstanding the fact that flow regulator 18 tends to maintain the flow rate constant in water line 10, there may, nevertheless, be variations for various reasons including load and supply disturbances. It is therefore desirable, if not necessary, to meter the flow rate in the water line. This is accomplished by a conventional turbine flow meter 22, which provides on its output line 24 electrical pulses having a frequency proportional to the water flow rate. These pulses may be 20 millivolts peak-to-peak, for example, which are converted to a zero based electrical analog signal on line 26 by a conventional frequency to D.C. voltage converter 28. The signal on line 26 may vary, for example, between 0 and 1 volt, to indicate the water flow rate W, in gallons per minute, for example. A water indicator 30 may be employed to provide a visual indication of the water flow rate. As will become more apparent below, the water rate signal on line 26 is applied to a summing junction 32 in a ratio, accumulated error computer 34, for the initial purpose of deriving an error signal on line 36, about which more is said later below.

In the syrup line 12, there are two elements. One is a controllable valve 38, which is pneumatically operated to varying degrees of closure for regulating the flow of syrup through line 12 in a manner described below. The other element in line 12 is an electromagnetic flow meter 40 of conventional type, preferably using stainless steel electrodes in the fluid path, in order to measure the velocity or rate of flow of the syrup. For useable constructions for flow meter 40, reference may be made to the Kolin Patent No. 2,149,847, issued Mar. 7, 1939, or the Romanowski et al. Patents 2,685,796 of Aug. 10, 1954, and 2,770,130 of Nov. 13, 1956. Flow meter 40 provides on its output line 42 a relatively small AC signal indicating the syrup flow rate. An A.C.-D.C. converter 44, commonly referred to as a transmitter, changes the small AC signal on line 42 into a zero based DC signal on line 46. This latter electrical signal, designated S, is of comparatively high power relative to the AC signal on line 42, and may range, for example, between 0 and 4 milliamps (ma.).

Turbine and magnetic flow meters are indicated above as being in the respective fluid lines, and it is to be understood that such is preferred for a soft drink proportioning and blending operation especially where the flow of normal and low caloric syrups is controlled by the equipment at different times. The magnetic flow meter is particularly good for handling either type of syrup without changing the equipment between runs. In other installations, however, both meters may be of the turbine type, or of the magnetic type, as desired.

In most all instances where different fluids are to be mixed, it is necessary to obtain the correct proportions of the fluids. For example, in some soft drinks, the ratio of water to syrup is 5:1. In the present arrangement, the desired ratio R is set into the system manually by manual adjustment of potentiometer 48, providing a product output signal RS on line 50. Then, the modified syrup signal RS equals the W signal on line 26 but only when the desired ratio actually exists between the water and syrup flow rates in the respective fluid lines 10 and 12. Should there be a difference between these signals, that difference appears as an error signal $e$ on line 36. The error signal is then integrated by integrator 52, which provides on its output line 54 a current signal ranging about zero, for example, from −2 to +2 ma., indicating the accumulated error or total quantity, in a measure such as gallons, of water over or under that which is desired.

By means of a transducer 56, the electrical signal on line 54 is converted to a corresponding pneumatic signal on line 58. As exemplary, this pneumatic signal may range between 3 and 15 p.s.i. with a 0 ma. input giving a 9 p.s.i. output. If the pneumatic signal deviates beyond that range, an alarm may be given by indicator 60. The pressure of the pneumatic signal on line 58 is indicated at the indicating control station 62, the output of which controls the amount of throttling accomplished by valve 38. In this manner, the syrup flow is regulated so that the water/syrup ratio as to the total blend is maintained correct, i.e., according to the ratio setting of potentiometer 48.

Potentiometer 48 is preferably of the digital indicating type, so that a desired ratio may be "set" into the system by the turn of an adjustment control according to the digits showing thereon. Preferably, the potentiometer 48 is calibrated from 0.00 through 9.99, allowing for more accurate control. For a 5 to 1 ratio, the potentiometer is set to 5.00.

As previously indicated, the blend of water and syrup is conveyed to a tank 14, which may be the cooling tank of a soft drink bottling plant. Since bottling demands vary from time to time, the level of fluid in tank 14 changes. When it is above a predetermined level sensed by a level sensor 64 (which is illustrated as a single sensor for convenience, but which may, of course, be a dual sensor for a high-low level signal), an electrical circuit is opened to both a solenoid valve 66 and relay 68. This immediately shuts down the system completely. That is, as is detailed more fully below relative to FIGURE 2, the de-energization of relay 68 discharges integrator 52 and shorts the input to the summing junction 32. The release of solenoid valve 66 allows pressurized air to be vented from the actuator of water line valve 20 through valve 66, thereby operating valve 20 to an off condition. Valve 66 also shuts the syrup valve 38 off, by virtue of its shutting off the air supply to the indicating control station 62.

As soon as the blended water and syrup level in tank 14 falls below the predetermined level sensed by sensor 64, solenoid valve 66 is re-energized so as to cause water valve 20 to reopen completely and syrup valve 38 to reopen and be under the control of the transduced integrated signal. Additionally, relay 68 re-energizes so that summing junction 32 and integrator 52 can again operate properly.

Reference is now made to FIGURE 2, for an explanation of preferred details of the accumulated error computer 34 of FIGURE 1. In FIGURE 2, the electrical analog signal indicating the rate of water flow is present across line 26, with terminal 70 being positive relative to terminal 72. The analog syrup signal on line 46 is connected negative to terminal 70 and positive to terminal 74. It will be noted in FIGURE 2 that terminal 70 is connected to the circuit common line 76, and therefore the connection of opposite polarities of the water and syrup signals thereto will cause the summing junction to actually subtract the values of the two electrical signals.

Connected across terminals 70 and 74 is a potentiometer 78 and a series resistance 80. Potentiometer 78 is employed to adjust the span of the syrup signal that is developed across ratio potentiometer 48, when relay coil CR of relay 68 is energized so that its contacts 82, 84, 86 and 88 are open while its contact 90 is closed. During this time, the portion of the syrup signal as determined by ratio potentiometer 48, and the water signal in negative form, are applied via summing resistors 92 and 94, respectively, to form an algebraic summation at junction 96. This summed signal is then applied to amplifier 98 which has an integrating condenser 100 connected with it, forming integrator 52 of FIGURE 1. The summed signal is applied to amplifier 98 in conjunction with bias determined by potentiometer 102. Power is applied to amplifier 98 from a power supply 104 in the manner illustrated. Potentiometer 106 in conjunction with resistors 108 and 110, as supplied with voltage from power source 104, regulates the span and rate of integration. The integrated error signal is provided from amplifier 98 as a current signal on line 112. The return of this line from transducer 56 in FIGURE 1 is via line 114 in FIGURE 2.

While the fluid level in tank 14 of FIGURE 1 is below the predetermined level, relay coil CR in FIGURES 1 and 2 is energized so as to allow the syrup and water input signals to be summed and integrated. However, as soon as the fluid level raises sufficiently to open the circuit to relay coil CR, each of the five relay contacts returns to its illustrated position. It is therefore apparent that the syrup signal is shorted by contact 82, while contacts 84 and 86 short resistors 94 and 114 to the common circuit line 76. Contact 90 opens the main water signal line, and contact 88 places resistor 116 across integrating condenser 100, to discharge the same. This completely disables the computer for the time that level sensor 64 keeps it turned off. As soon as the tank fluid level drops below the predetermined level, relay 68 is re-energized in order to let the computer operate again.

The output of integrator 52 may be converted to a pneumatic signal in the manner above-indicated, and, in particular valve 38 may be operated by a conventional pneumatic or electronic proportional plus reset controller, whose set point is set at zero error. Reference is made to the pneumatic controller in Clarridge Patent No. 2,638,919, of May 19, 1953, and the electronic controller in Nichols Patent No. 3,127,105, of Mar. 31, 1964, as useful types of controllers. Any sudden change in the flow rate of either water or syrup results in an error, which is totalized by the integrator effecting a time summation of the error. The controller then sees this change as a deviation from its set point and consequently repositions the control valve 38 to vary the flow of syrup in order to correct the ratio. In accomplishing this, valve 38 is overcompensated to produce an error signal of opposite polarity until the initial deviation or error signal on line 36 and the integral on line 54 is reduced to zero. Hence, the system makes up for the accumulated error due to the sudden change in one line or the other by adding or subtracting enough syrup flow to keep the total of each fluid in the batch at the specified ratio. Thus, the accumulated or ratio error computer 34 aids the controller in maintaining zero error in the totalized flow rates, and this keeps the blend always at the specified ratio. The same result is obtained by the system specified in FIGURE 1.

The overall accuracy of the system is almost entirely dependent on the measuring accuracy of flow meters 22 and 40. This is true because each fluid stream is controlled on the basis of total deviation from the required quantity of that stream.

Preferably, transmitters or converters 28 and 44 are linear as are meters 22 and 40, and peferably the electrical signals from these converters are zero based. If these signals are not zero based or are not linear, appropiate input conditioners can be incorporated into the system. For example, square root extractors may be employed for non-linear signals derived from differential pressure transmitters.

From the foregoing, it is apparent that the system of this invention performs the task of blending two fluid streams on the basis of accumulated total, causing the control valve 38 to maintain its total accumulated flow in the proper ratio. The accumulation is effected by determining the error signal and storing that signal as a function of time, using the summing integrator.

What is claimed is:

1. Apparatus for proportioning a plurality of fluids comprising:
   a first line for supplying a first fluid,
   a second line for supplying a second fluid,
   means for providing a first electrical signal indicating the rate of flow of said first fluid,
   means for providing a second electrical signal indicating the rate of flow of said second fluid,
   means operative on one of said electrical signals for changing its value by a predetermined factor toward that of the other of said electrical signals,
   means for obtaining an integration of the difference between said changed electrical signal and the said other electrical signal to provide an integrated error signal,
   means responsive to said integrated error signal for controlling the flow of fluid in one of said lines to maintain the total quantities through said lines at a ratio corresponding to said factor,
   blending means, including a tank, connected to receive fluid from each of said lines,
   means for sensing reduction and increase of the fluid level in said tank respectively below and above a predetermined level,
   means in the fluid line other than said one fluid line for preventing and allowing fluid flow therethrough in response to the sensing by said sensing means of the fluid level in said tank respectively above and below said predetermined level,
   the said means for controlling fluid flow in the said one of said lines being also responsive to said sensing means for preventing and allowing flow therethrough respectively in response to sensing by said sensing means of the fluid level in said tank above and below said predetermined level, and
   means responsive to said sensing means for discharging said integration means and effectively short-circuiting at least one of said electrical signals only while the fluid level in said tank is above said predetermined level.

2. Apparatus for proportioning and blending a plurality of fluids comprising:
   a first line for supplying a first fluid,
   a flow regulator in said first line for maintaining the flow therethrough substantially constant,
   means including flow rate sensing means in said first line for deriving a first electrical analog signal indicating the rate of flow of fluid in said first line,
   a controllable on-off valve in said first line,
   a second line for supplying a second fluid,
   a controllable valve in said second line for regulating the amount of flow therethrough,
   means including flow rate sensing means in said second line for deriving a second electrical analog signal indicating the rate of flow of the said second fluid,
   a digital ratio potentiometer for manually determining the desired ratio of said second fluid to said first fluid by effectively multiplying said second electrical signal by that ratio,
   means including an electronic summing integrator responsive to said first electrical signal and said multiplied electrical signal for determining the difference therebetween and electronically integrating that difference to effect an integrated error signal indicating the accumulated error that said first fluid is greater or less in total amount than it should be relative to the second fluid after taking said ratio into account,
   means, including a container, for blending and storing the blended fluids from said first and second lines,
   fluid level sensing means on said container for shutting both of said valves in said lines and said summing integrator off when the fluid level in said container rises above a predetermined level and for reopening both of said valves and turning on said summing integrator when the container fluid drops below said predetermined level, and
   means coupling the said integrated error signal to said controllable valve in said second line to regulate the flow of fluid therethrough and to reduce the said accumulated error toward zero.

3. Apparatus as in claim 2 wherein:
   said first signal deriving means includes a turbine meter as its said flow rate sensing means and a frequency to D.C. converter coupled to the output of the frequency meter for causing said first electrical analog signal to be zero based, and
   said second signal deriving means includes as its said flow rate sensing means a magnetic flow meter having stainless steel electrodes in said second fluid, and an A.C. to D.C. converter coupled to the output of the flow meter for causing the said second electrical analog signal to be zero based.

4. Apparatus as in claim 2 wherein said summing integrator includes a summing circuit connected to receive said first and multiplied electrical signals in opposite polarities so that the summing of those signals effects a subtraction thereof.

5. Apparatus as in claim 2 wherein said summing integrator includes an integrating condenser and means coupled across said condenser for discharging the condenser in response to the container fluid rising above said predetermined level and for allowing the condenser to be charged again by the sum of the ratioed electrical signals when the fluid level drops below that predetermined level.

6. Apparatus as in claim 5 and further including means for effectively disconnecting said first and second electrical signals from the said summing integrator when the container fluid level rises above said predetermined level and for effectively reconnecting same when that fluid level drops below the predetermined level.

7. Apparatus as in claim 6 wherein the integrated error signal is a current signal and wherein said integrator has means for adjusting the integration rate, said controllable valve means in said second line being of the pneumatically operated type and being coupled to said integrator by means for transducing said current signal to a corresponding pneumatic signal.

8. A system comprising:
first and second flow lines,
apparatus associated with said first and second flow lines for providing two electrical analog signals indicating respective fluid flow rates through said first and second flow lines for controlling the accumulated relative quantities of fluids respectively flowing at said rates,
a container connected to said first and second flow lines for receiving said fluids and having means in said container for sensing the rise and fall of the fluid accumulation in said container above and below a predetermined level respectively to stop and start flow of said fluids,
an electronic accumulated error computer having an integrator for accumulating errors including an amplifier and condenser and having a summing circuit connected to the input of said integrator,
means, including a ratio potentiometer operating on one of said electrical analog signals to equalize them, for connecting those electrical analog signals in opposite polarities to said summing circuit to obtain a different signal indicating any instant error between the ratioed signals,
means responsive to said sensing means for discharging said condenser and effectively disconnecting said analog signals from said summing circuit when the accumulated fluid in said container rises above said predetermined level and for effectively reconnecting said analog signals to said summing circuit and allowing said condenser to be charged by the output of that circuit when the container fluid drops below that predetermined level, and
means responsive to said sensing means for preventing said container from receiving said fluids when said accumulated fluid rises above said predetermined level.

References Cited
UNITED STATES PATENTS

| | | | |
|---|---|---|---|
| 2,770,130 | 11/1956 | Romanowski et al. | |
| 2,800,919 | 7/1957 | Kates | 137—504 |
| 2,830,245 | 4/1958 | Davis et al. | 318—20.390 |
| 3,020,490 | 2/1962 | Kleiss | 137—86 X |
| 3,214,660 | 10/1965 | Smoot | 318—20.390 |
| 3,229,077 | 1/1966 | Gross | 137—101.19 X |
| 3,315,250 | 4/1967 | Higgins | 137—82 X |
| 3,322,938 | 5/1967 | Weiss | 137—101.19 X |

WILLIAM F. O'DEA, Primary Examiner

DAVID J. ZOBKIW, Assistant Examiner

U.S. Cl. X.R.

235—151.34; 137—101.25; 318—18